United States Patent
Zhang et al.

(10) Patent No.: US 11,924,146 B2
(45) Date of Patent: Mar. 5, 2024

(54) FULL DUPLEX UPLINK AND DOWNLINK SCHEDULING

(71) Applicant: QUALCOMM Incorporated, San Diego, CA (US)

(72) Inventors: Qian Zhang, Basking Ridge, NJ (US); Yan Zhou, San Diego, CA (US); Junyi Li, Franklin Park, NJ (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/193,968

(22) Filed: Mar. 5, 2021

(65) Prior Publication Data

US 2022/0286264 A1    Sep. 8, 2022

(51) Int. Cl.
*H04L 5/14* (2006.01)
*H04W 74/00* (2009.01)
*H04W 74/04* (2009.01)
*H04W 76/15* (2018.01)

(52) U.S. Cl.
CPC ............. *H04L 5/14* (2013.01); *H04W 74/002* (2013.01); *H04W 74/04* (2013.01); *H04W 76/15* (2018.02)

(58) Field of Classification Search
CPC ............. H04W 72/04; H04W 72/0406; H04W 72/0413; H04W 72/042; H04W 72/044; H04W 72/0453; H04W 72/046; H04W 72/1278; H04W 72/1289; H04W 16/28; H04W 76/10; H04W 76/15; H04W 74/002; H04W 74/004; H04W 74/006; H04W 74/04; H04L 5/0048; H04L 5/0053; H04L 5/0023; H04L 5/14; H04L 5/16; H04B 7/0695; H04B 7/088; H04B 7/0617; H04B 7/0408
See application file for complete search history.

(56) References Cited

U.S. PATENT DOCUMENTS

| | | | |
|---|---|---|---|
| 11,382,121 B2 * | 7/2022 | Marinier | H04L 5/0094 |
| 2016/0028533 A1 | 1/2016 | Kazmi et al. | |
| 2016/0219583 A1 | 7/2016 | Blankenship | |
| 2018/0227102 A1 * | 8/2018 | John Wilson | H04L 5/0023 |
| 2018/0262993 A1 * | 9/2018 | Akkarakaran | H04W 52/362 |
| 2019/0116605 A1 * | 4/2019 | Luo | H04B 7/024 |
| 2020/0313747 A1 | 10/2020 | Xu et al. | |
| 2022/0029761 A1 | 1/2022 | Su et al. | |
| 2022/0166595 A1 | 5/2022 | Laselva et al. | |
| 2022/0286871 A1 | 9/2022 | Zhang et al. | |

* cited by examiner

*Primary Examiner* — Peter Chen
(74) *Attorney, Agent, or Firm* — QUALCOMM Incorporated

(57) ABSTRACT

Various aspects of the present disclosure generally relate to wireless communication. In some aspects, a user equipment (UE) may receive, in a full duplex transmission mode, at least one downlink control information (DCI) transmission for scheduling an uplink communication and a downlink communication, wherein the at least one DCI transmission indicates a full duplex beam pair including a first beam associated with the uplink communication and a second beam associated with the downlink communication. The UE may communicate with at least one wireless communication device based at least in part on the uplink communication and the downlink communication. Numerous other aspects are described.

24 Claims, 12 Drawing Sheets

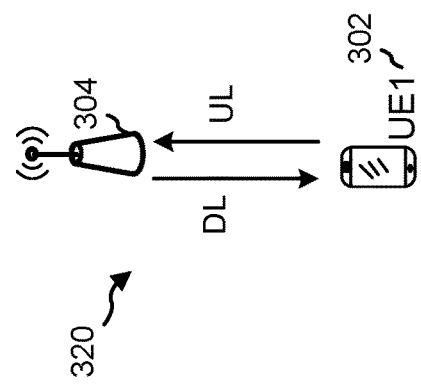
FIG. 3B
FIG. 3C
FIG. 3A

FULL DUPLEX UPLINK AND DOWNLINK SCHEDULING

FIELD OF THE DISCLOSURE

Aspects of the present disclosure generally relate to wireless communication and to techniques and apparatuses for full duplex uplink and downlink scheduling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, operatively coupled to the memory, configured to: receive, in a full duplex transmission mode, at least one downlink control information (DCI) transmission for scheduling an uplink communication and a downlink communication, wherein the at least one DCI transmission indicates a full duplex beam pair including a first beam associated with the uplink communication and a second beam associated with the downlink communication; and communicate with at least one wireless communication device based at least in part on the uplink communication and the downlink communication.

In some aspects, a base station for wireless communication includes a memory and one or more processors, operatively coupled to the memory, configured to: transmit, to a UE that is in a full duplex transmission mode, at least one DCI transmission for scheduling an uplink communication and a downlink communication, wherein the at least one DCI transmission indicates a full duplex beam pair including a first beam associated with the uplink communication and a second beam associated with the downlink communication; and communicate with the UE based at least in part on at least one of the uplink communication or the downlink communication.

In some aspects, a method of wireless communication performed by a UE includes receiving, in a full duplex transmission mode, at least one DCI transmission for scheduling an uplink communication and a downlink communication, wherein the at least one DCI transmission indicates a full duplex beam pair including a first beam associated with the uplink communication and a second beam associated with the downlink communication; and communicating with at least one wireless communication device based at least in part on the uplink communication and the downlink communication.

In some aspects, a method of wireless communication performed by a base station includes transmitting, to a UE that is in a full duplex transmission mode, at least one DCI transmission for scheduling an uplink communication and a downlink communication, wherein the at least one DCI transmission indicates a full duplex beam pair including a first beam associated with the uplink communication and a second beam associated with the downlink communication; and communicating with the UE based at least in part on at least one of the uplink communication or the downlink communication.

In some aspects, a non-transitory computer-readable medium storing a set of instructions for wireless communication includes one or more instructions that, when executed by one or more processors of a UE, cause the UE to: receive, in a full duplex transmission mode, at least one DCI transmission for scheduling an uplink communication and a downlink communication, wherein the at least one DCI transmission indicates a full duplex beam pair including a first beam associated with the uplink communication and a second beam associated with the downlink communication; and communicate with at least one wireless communication device based at least in part on the uplink communication and the downlink communication.

In some aspects, a non-transitory computer-readable medium storing a set of instructions for wireless communication includes one or more instructions that, when executed by one or more processors of a base station, cause the base station to: transmit, to a UE that is in a full duplex transmission mode, at least one DCI transmission for scheduling an uplink communication and a downlink communication, wherein the at least one DCI transmission indicates a full duplex beam pair including a first beam associated with the uplink communication and a second beam associated with the downlink communication; and communicate with the UE based at least in part on at least one of the uplink communication or the downlink communication.

In some aspects, an apparatus for wireless communication includes means for receiving, in a full duplex transmission mode, at least one DCI transmission for scheduling an uplink communication and a downlink communication, wherein the at least one DCI transmission indicates a full duplex beam pair including a first beam associated with the uplink communication and a second beam associated with the downlink communication; and means for communicating with at least one wireless communication device based at least in part on the uplink communication and the downlink communication.

In some aspects, an apparatus for wireless communication includes means for transmitting, to a UE that is in a full duplex transmission mode, at least one DCI transmission for scheduling an uplink communication and a downlink communication, wherein the at least one DCI transmission indicates a full duplex beam pair including a first beam associated with the uplink communication and a second beam associated with the downlink communication; and means for communicating with the UE based at least in part on at least one of the uplink communication or the downlink communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples of full duplex communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
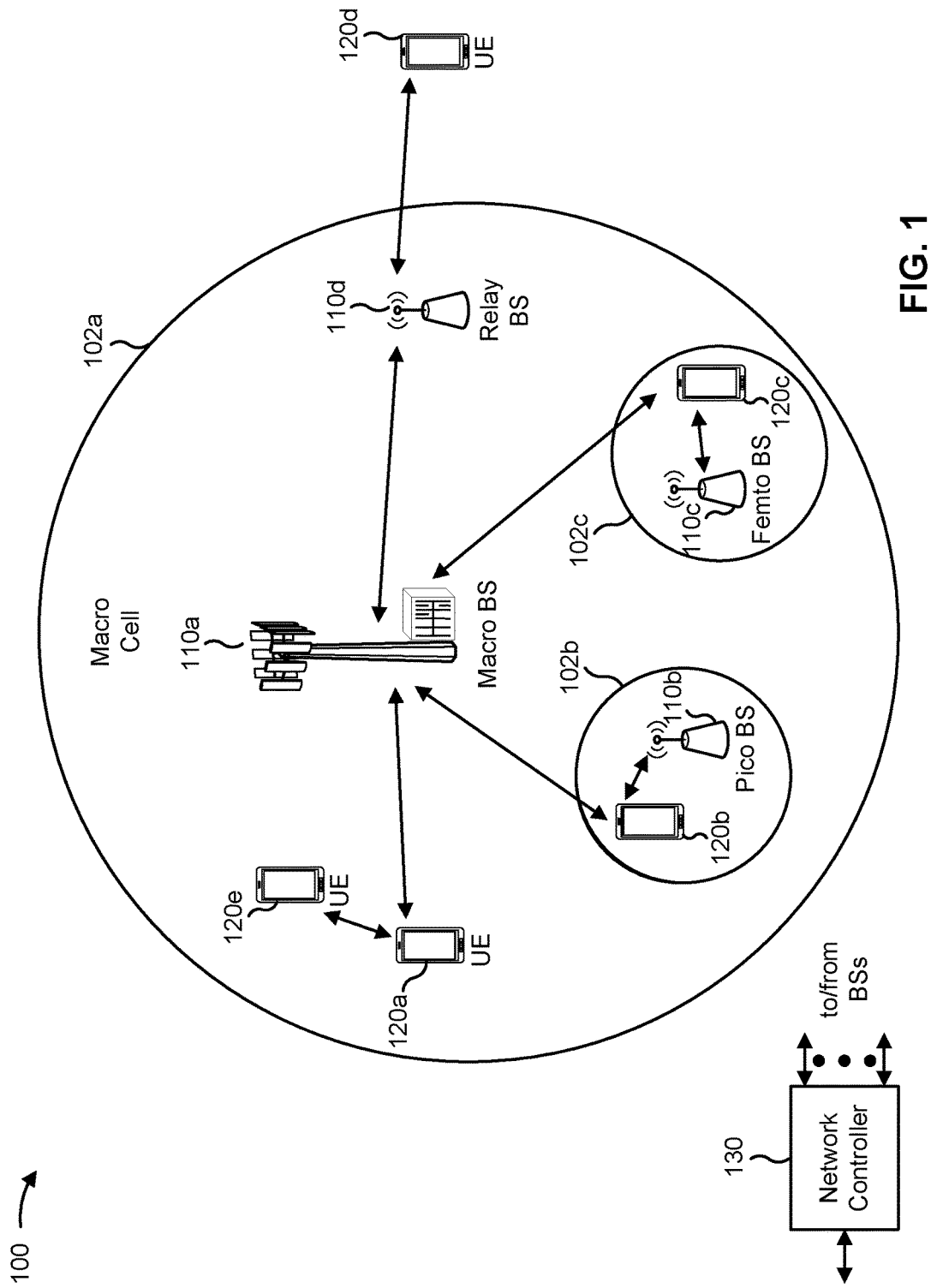
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
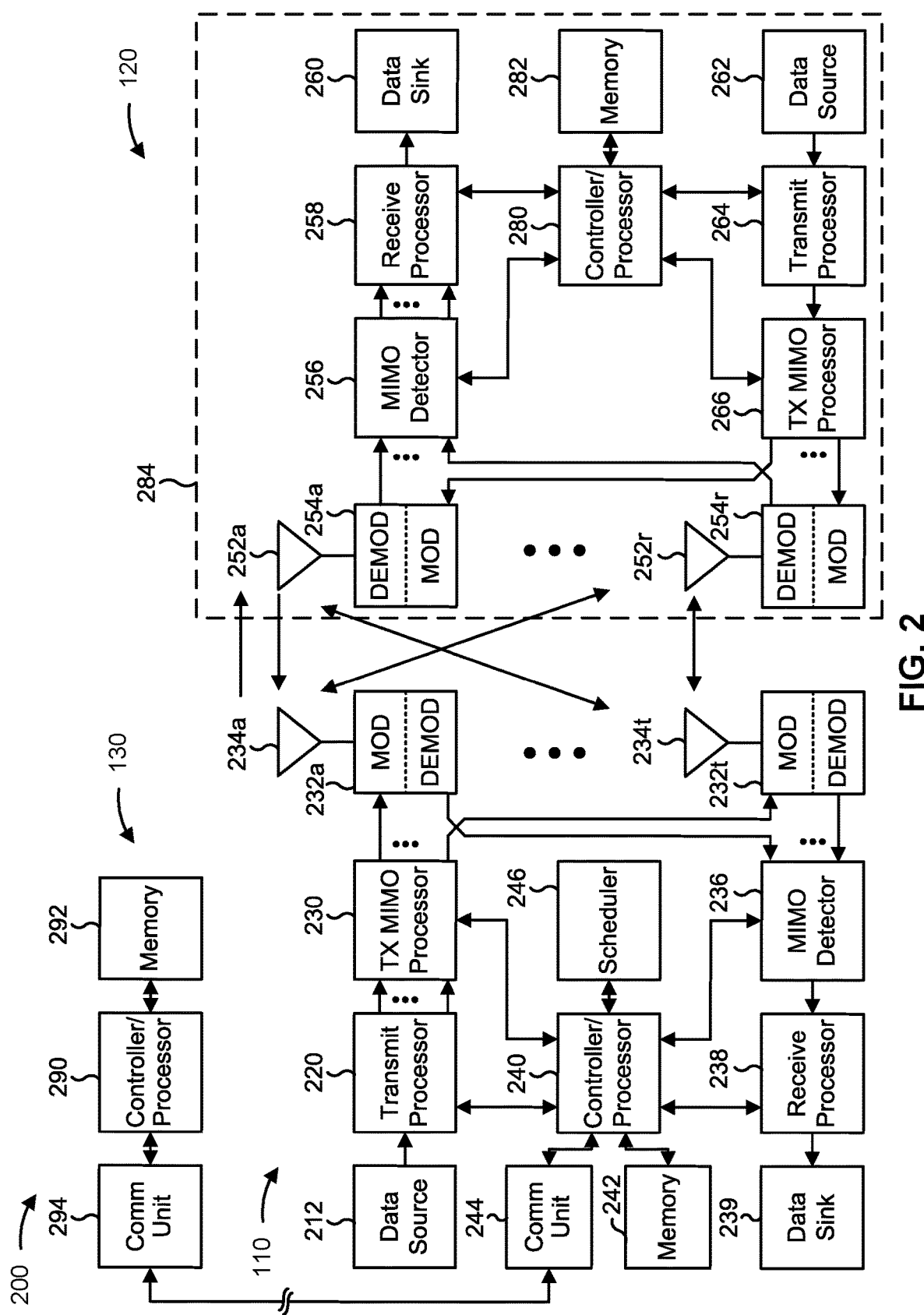
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-10).

Controller/processor 240 of base station 110, controller/processor 280 of UE 120, and/or any other component(s) of FIG. 2 may perform one or more techniques associated with full duplex uplink and downlink scheduling, as described in more detail elsewhere herein. In some aspects, the TRP described herein is the base station 110, is included in the base station 110, or includes one or more components of the base station 110 shown in FIG. 2. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, the UE includes means for receiving, in a full duplex transmission mode, at least one downlink control information (DCI) transmission for scheduling an uplink communication and a downlink communication, wherein the at least one DCI transmission indicates a full duplex beam pair including a first beam associated with the uplink communication and a second beam associated with the downlink communication; and/or means for communicating with at least one wireless communication device based at least in part on the uplink communication and the downlink communication. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for transmitting, to a UE that is in a full duplex transmission mode, at least one DCI transmission for scheduling an uplink communication and a downlink communication, wherein the at least one DCI transmission indicates a full duplex beam pair including a first beam associated with the uplink communication and a second beam associated with the downlink communication; and/or means for communicating with the UE based at least in part on at least one of the uplink communication or the downlink communication. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIGS. 3A-3C are diagrams illustrating examples 300, 310, 320 of full duplex (FD) communication in accordance with the present disclosure. The example 300 of FIG. 3A includes a UE1 302 and two base stations (e.g., TRPs) 304-1, 304-2, wherein the UE1 302 is sending uplink (UL) transmissions to base station 304-1 and is receiving downlink (DL) transmissions from base station 304-2. In the example 300 of FIG. 3A, FD is enabled for the UE1 302, but not for the base stations 304-1, 304-2. The example 310 of FIG. 3B includes two UEs, UE1 302-1 and UE2 302-2, and a base station 304, wherein the UE1 302-1 is receiving a DL transmission from the base station 304 and the UE2 302-2 is transmitting a UL transmission to the base station 304. In the example 310 of FIG. 3B, FD is enabled for the base station 304, but not for the UEs UE1 302-1 and UE2 302-2. The example 320 of FIG. 3C includes a UE1 302 and a base station 304, wherein the UE1 302 is receiving a DL transmission from the base station 304 and the UE1 302 is transmitting a UL transmission to the base station 304. In the example 320 of FIG. 3C, FD is enabled for both the UE1 302 and the base station 304.

The present disclosure generally relates to scheduling resources for FD communication. FD capability may be present at either a base station or a UE, or both. For example, for a UE, UL transmission may be from one antenna panel, and DL reception may be in another antenna panel. FD communication may be conditional on a beam separation of the UL beam and DL beam at the respective antenna panels. Utilizing FD communication may provide a reduction in latency, such that it may be possible to receive a DL signal in UL-only slots, which may enable latency savings. In addition, FD communication may enhance spectrum efficiency per cell or per UE, and may allow for a more efficient utilization of resources.

Beam separation of the UL and DL beams assist in limiting or reducing self-interference that may occur during FD communication. It is desirable to select UL and DL beams that are on different antenna panels to minimize self-interference. Determining the UL and DL beams that are separated on their respective antenna panels may provide a reliable FD communication by facilitating selection of beam pairs that minimize or reduce self-interference.

An FD UE may perform a self-interference measurement (SIM) procedure in order to identify self-interference from transmissions of the FD UE. An FD base station also may perform a SIM procedure in order to identify self-interference from transmissions of the FD base station. The UE may provide a measurement report to the base station to indicate results of the UE SIM. The base station may select pairs of beams (referred to herein as "beam pairs") for the UE ("UE beam pairs") and the base station ("base station beam pairs") to use during FD communications. A beam pair may include a UL beam and a DL beam. In some aspects, a beam pair may include a receive (Rx) beam and a transmit (Tx) beam.

The UL and DL beam pairs may be used to transmit and receive communications, respectively. However, to facilitate the communications, resources must be scheduled. DL and UL transmissions may include dynamic traffic, semi-persistent traffic, and/or periodic traffic. Additionally, or alternatively, FD communications may be useful if scheduled across two or more component carriers (CCs), for multiple TRP (mTRP) communications, and/or for repetitions.

Some techniques and apparatuses described herein provide for FD UL and DL scheduling. Resources may be scheduled for selected beam pairs. In some aspects, a base station may transmit, to a UE, at least one DCI transmission for scheduling a UL communication and a DL communication. The DCI transmission may indicate an FD beam pair including a first beam associated with the UL communication and a second beam associated with the DL communication. The UE may communicate with at least one wireless communication device based at least in part on the UL communication and the DL communication. Some aspects may facilitate scheduling across two or more CCs, for mTRP communications, and/or for repetitions, among other examples. In this way, some aspects of the techniques and apparatuses described herein may facilitate scheduling FD resources, thereby having a positive impact on network performance.

As indicated above, FIGS. 3A-3C are provided as one or more examples. Other examples may differ from what is described with regard to FIGS. 3A-3C.

Figure 4:
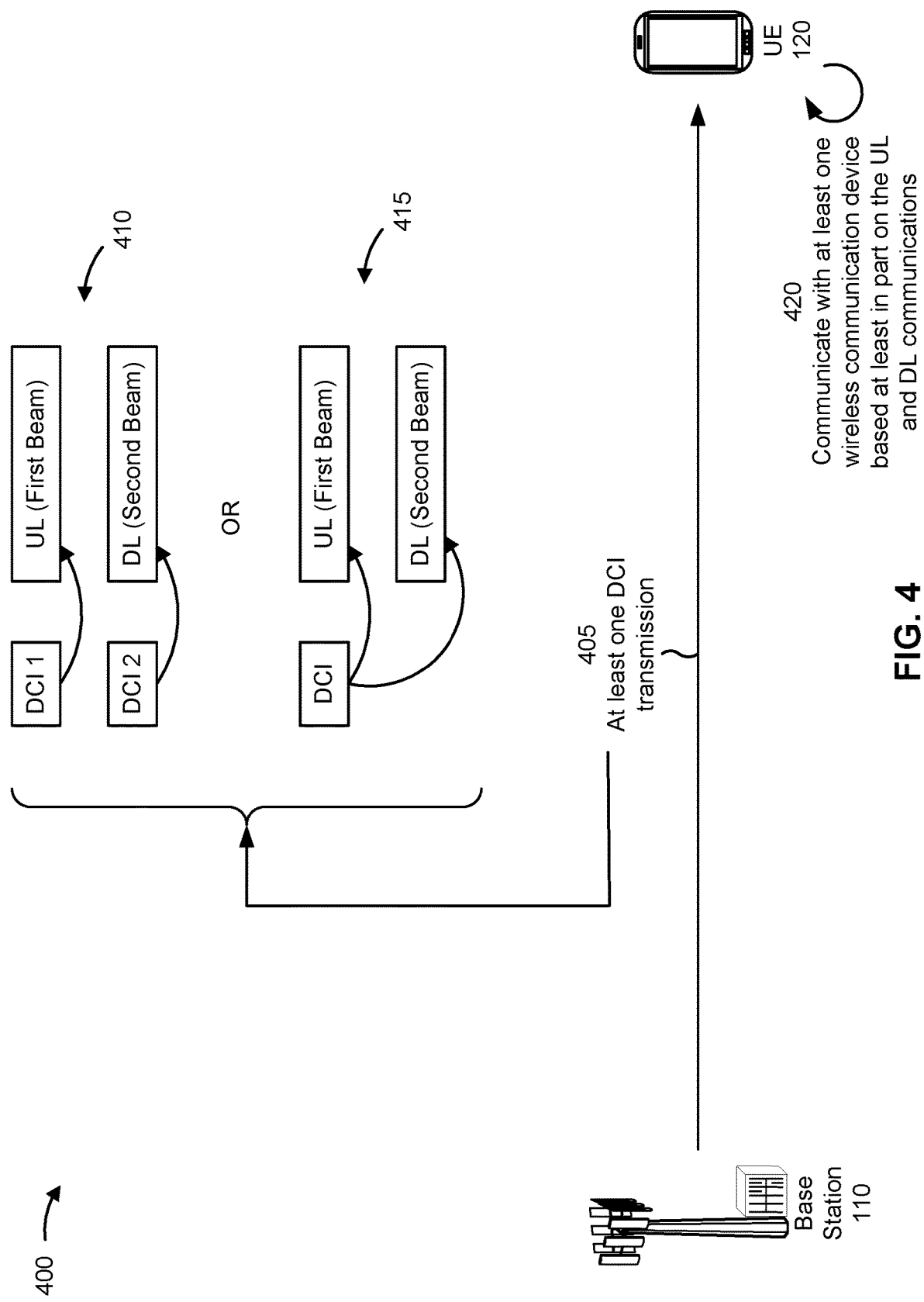
FIGS. 4-8 are diagrams illustrating examples associated with full duplex uplink and downlink scheduling, in accordance with the present disclosure.

FIG. 4 is a diagram illustrating an example 400 associated with full duplex uplink and downlink scheduling, in accordance with the present disclosure. As shown in FIG. 4, a base station 110 and a UE 120 may communicate with one another.

As shown by reference number 405, the base station 110 may transmit, and the UE 120 may receive, in a full duplex transmission mode, at least one DCI transmission for scheduling an uplink communication and a downlink communication. The at least one DCI transmission may indicate a full duplex beam pair to be used for the uplink communication and the downlink communication. For example, the full duplex beam pair may include a first beam associated with the uplink communication and a second beam associated with the downlink communication. The first beam and the second beam may be associated with a first antenna panel and a second antenna panel, respectively. In some aspects, the first beam and the second beam may be selected (e.g., by the base station 110) to minimize cross-beam interference during full duplex communications.

In some aspects, the at least one DCI transmission may include one DCI transmission, two DCI transmissions, three DCI transmissions, four DCI transmissions, or any number of DCI transmissions appropriate for a particular implementation. In some aspects, the at least one DCI transmission may be fully duplexed with an uplink signal such as an uplink feedback signal. In some aspects, the at least one DCI transmission may indicate a resource allocation for the uplink communication and the downlink communication. The resource allocation may include a dynamic resource allocation, a periodic resource allocation, and/or a semi-persistent resource allocation.

In some aspects, the at least one DCI may be used to schedule across CCs. For example, the at least one DCI may indicate a first CC associated with the uplink communication and a second CC associated with the downlink communication. The at least one DCI transmission may be associated with a third CC. In some aspects, the at least one DCI may be used to schedule full duplex communications in a multiple TRP scenario. For example, the uplink communication may be an uplink communication to a first TRP of a plurality of TRPs, and the downlink communication may be a downlink communication from a second TRP of the plurality of TRPs.

As shown by reference number 410, the at least one DCI transmission may include two separate DCI transmissions. As shown, a first DCI transmission (shown as "DCI 1") may schedule the uplink transmission and a second DCI transmission (shown as "DCI 2") may schedule the downlink transmission. For example, DCI 1 may indicate a resource allocation for the uplink transmission and DCI 2 may indicate a resource allocation for the downlink transmission. The uplink transmission may include a physical uplink shared channel (PUSCH) transmission and the downlink transmission may include a physical downlink shared channel (PDSCH) transmission. As shown, DCI 1 may indicate a first beam for use with the uplink transmission and DCI 2 may indicate a second beam for use with the downlink transmission. The uplink and downlink beams indicated in the two separate DCIs may be paired for FD mode. The resource allocations may be fully overlapped, partially overlapped, or fully distinct.

As shown by reference number 415, one DCI transmission may be used to schedule both the uplink transmission and the downlink transmission. The DCI transmission may include a dedicated DCI format transmitted via a physical downlink control channel (PDCCH) or a modified existing DCI format. In some aspects, the one DCI transmission may indicate a resource allocation and a first beam corresponding to the uplink transmission and a resource allocation and a second beam corresponding to the downlink transmission. The DCI transmission may indicate time resources, frequency resources, an indication of the downlink/uplink beam pair, a repetition indication for DL and UL beams, and/or an acknowledgement/negative acknowledgement (ACK/NACK) schedule that may indicate feedback resources. Feedback resources may include full duplex resources and/or half duplex resources. In some aspects, using a single DCI transmission, as shown by reference number 420, may enable the use of a single search space with less blind decoding and signaling overhead than using multiple DCI transmissions.

In some aspects, the uplink communication and/or the downlink communication may be repeated using one or more repetitions. The at least one DCI transmission may indicate at least one repetition of the uplink communication and/or at least one repetition of the downlink communication. In some aspects, the at least one DCI transmission may indicate a beam sweeping procedure associated with at least one of the at least one repetition of the uplink communication and the at least one repetition of the downlink communication. For example, a first repetition of the at least one repetition of the uplink communication may be associated with a first beam and a second repetition of the at least one repetition of the uplink communication may be associated with a second beam. A first repetition of the at least one repetition of the downlink communication may be associated with a third beam that is paired with the first beam, and a second repetition of the at least one repetition of the downlink communication may be associated with a fourth beam that is paired with the second beam. In some aspects, beam sweeping may be used for the uplink communication or the downlink communication, in which case the sweeping beams may be paired with the single beam of the other communication, thus resulting in some interference, which may be reduced based at least in part on beam selection.

As shown by reference number 420, the UE 120 may communicate with at least one wireless communication device based at least in part on the uplink communication and the downlink communication. The at least one wireless communication device may include the base station 110, and/or other wireless communication device.

As indicated above, FIG. 4 is provided as an example. Other examples may differ from what is described with respect to FIG. 4.

Figure 5:
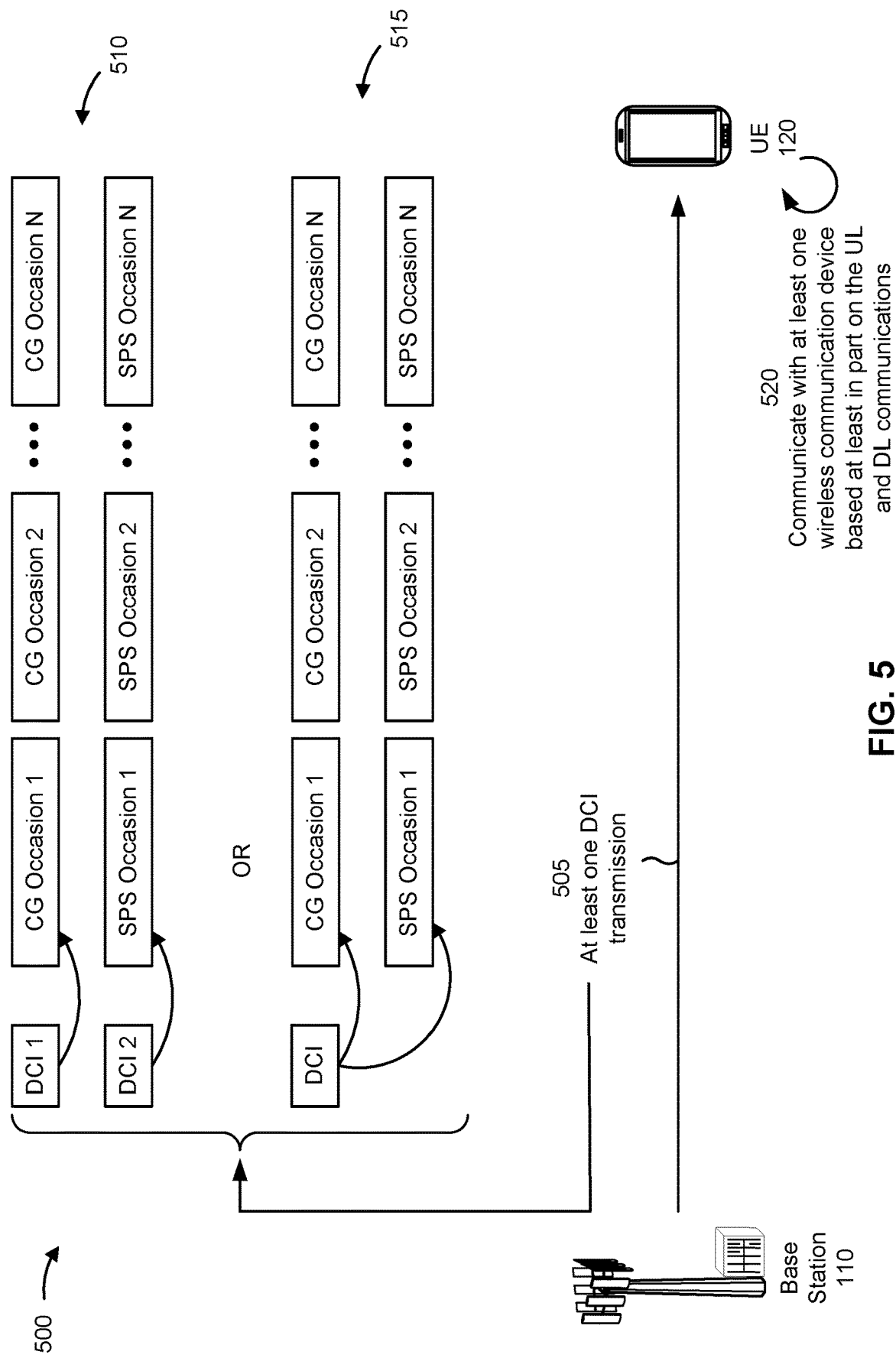

FIG. 5 is a diagram illustrating an example 500 of full duplex uplink and downlink scheduling, in accordance with the present disclosure. As shown in FIG. 5, a base station 110 and a UE 120 may communicate with one another. Example 500 illustrates allocation of full duplex resources for semi-persistent scheduling (SPS) communications and configured grants (CGs).

As show by reference number 505, the base station 110 may transmit, and the UE 120 may receive, at least one DCI transmission for scheduling an uplink communication and a downlink communication. The uplink communication may be associated with a CG allocation and the downlink communication may be associated with an SPS allocation. For example, as shown by reference number 510, the at least one DCI transmission may include two DCI transmissions. A first DCI transmission (shown as "DCI 1") may schedule and/or activate the CG allocation, and a second DCI transmission (shown as "DCI 2") may schedule and/or activate the SPS allocation.

In some aspects, for example, the CG occasions (shown as "CG Occasion 1," "CG Occasion 2," . . . , "CG Occasion N") and/or the SPS occasions (shown as "SPS Occasion 1," "SPS Occasion 2," . . . , "SPS Occasion N") may be configured by a radio resource control (RRC) message and activated (and/or deactivated) by the respective DCI transmission. In some aspects, resource allocation may be fully configured and released using RRC signaling for longer term requirements. In some aspects, resource allocation may be partially configured using RRC signaling and may be subsequently activated and deactivated using PDCCH transmissions.

As shown by reference number 515, the at least one DCI transmission may be one DCI transmission that activates and/or deactivates both the CG communications and the SPS communications. As shown by reference number 520, the UE 120 may communicate with at least one wireless communication device based at least in part on the CG communications and the SPS communications.

As indicated above, FIG. 5 is provided as an example. Other examples may differ from what is described with respect to FIG. 5.

Figure 6:
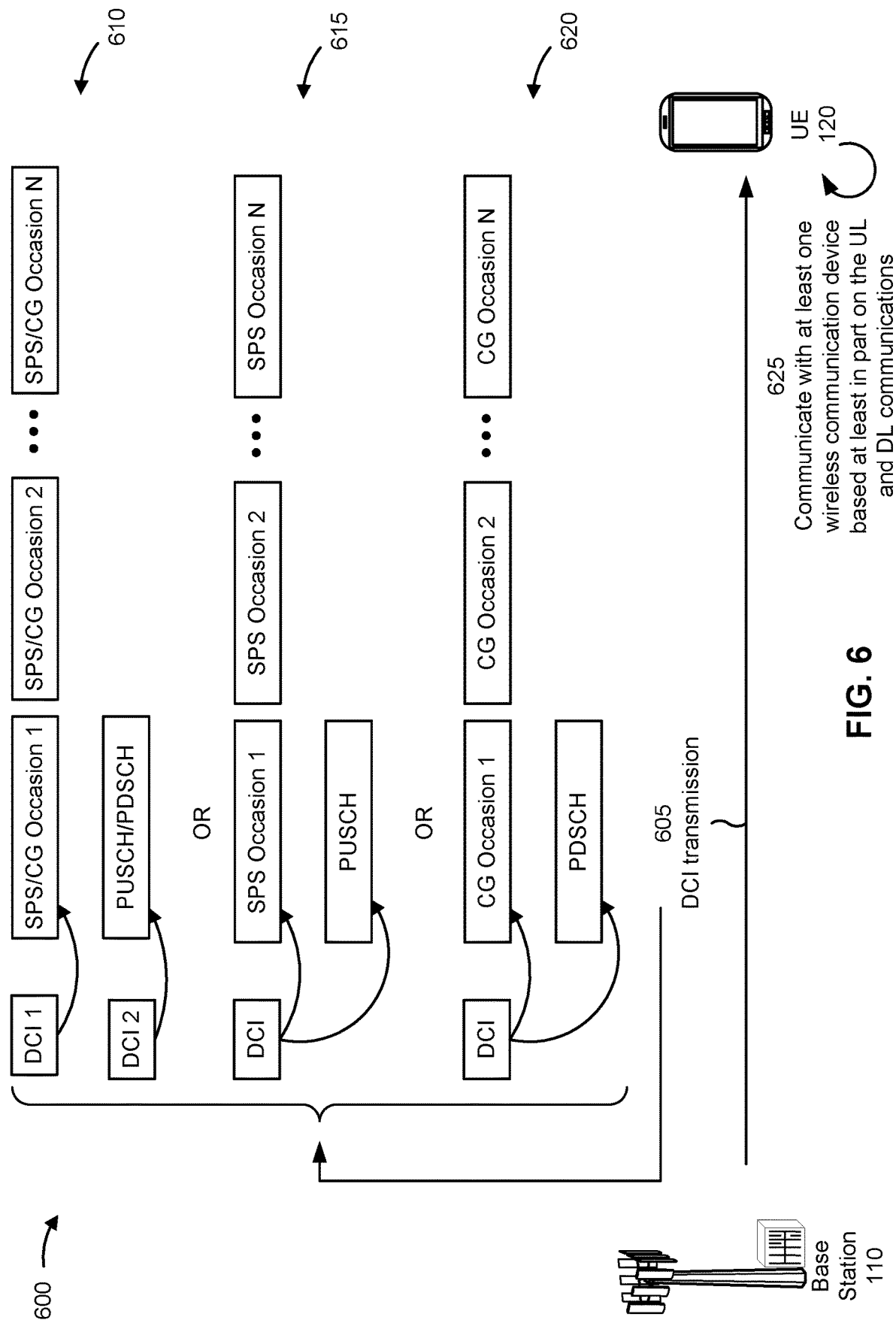

FIG. 6 is a diagram illustrating an example 600 of full duplex uplink and downlink scheduling, in accordance with the present disclosure. As shown in FIG. 6, a base station 110 and a UE 120 may communicate with one another. Example 600 illustrates allocation, using a single DCI transmission, of semi-persistent resources and dynamic resources.

As show by reference number 605, the base station 110 may transmit, and the UE 120 may receive, a DCI transmission for scheduling an uplink communication and a downlink communication. As shown by reference number 610, multiple DCI transmissions may be used to allocate semi-persistent resources and dynamic resources. For example, as shown, a first DCI transmission (shown as "DCI 1") may be used to allocate SPS resources or CG resources (shown as "SPS/CG Occasion 1," "SPS/CG Occasion 2," . . . , "SPS/CG Occasion N"). A second DCI transmission (shown as "DCI 2") may be used to allocate dynamic resources (shown as "PUSCH/PDSCH"). For example, DCI 1 may be used to allocate SPS resources and DCI 2 may be used to allocate PUSCH resources, or DCI 1 may be used to allocate CG resources and DCI 2 may be used to allocate PDSCH resources.

As shown by reference number 615, the downlink communication may be associated with an SPS allocation and the uplink communication may be a dynamic allocation associated with a PUSCH. The resource allocation may be partially configured using RRC signaling and may be subsequently activated and/or deactivated using PDCCH transmissions (e.g., the DCI transmission). The full duplex beam pair may include the dynamic uplink beam and a paired SPS downlink beam.

As shown by reference number 620, the uplink communication many be associated with a CG allocation and the downlink communication may be a dynamic allocation associated with a PDSCH. The resource allocation may be partially configured using RRC signaling and may be subsequently activated and/or deactivated using PDCCH transmissions (e.g., the DCI transmission). The full duplex beam pair may include the dynamic downlink beam and a paired CG uplink beam. As shown by reference number 625, the UE 120 may communicate with at least one wireless communication device based at least in part on the uplink and downlink communications.

As indicated above, FIG. 6 is provided as an example. Other examples may differ from what is described with respect to FIG. 6.

Figure 7:
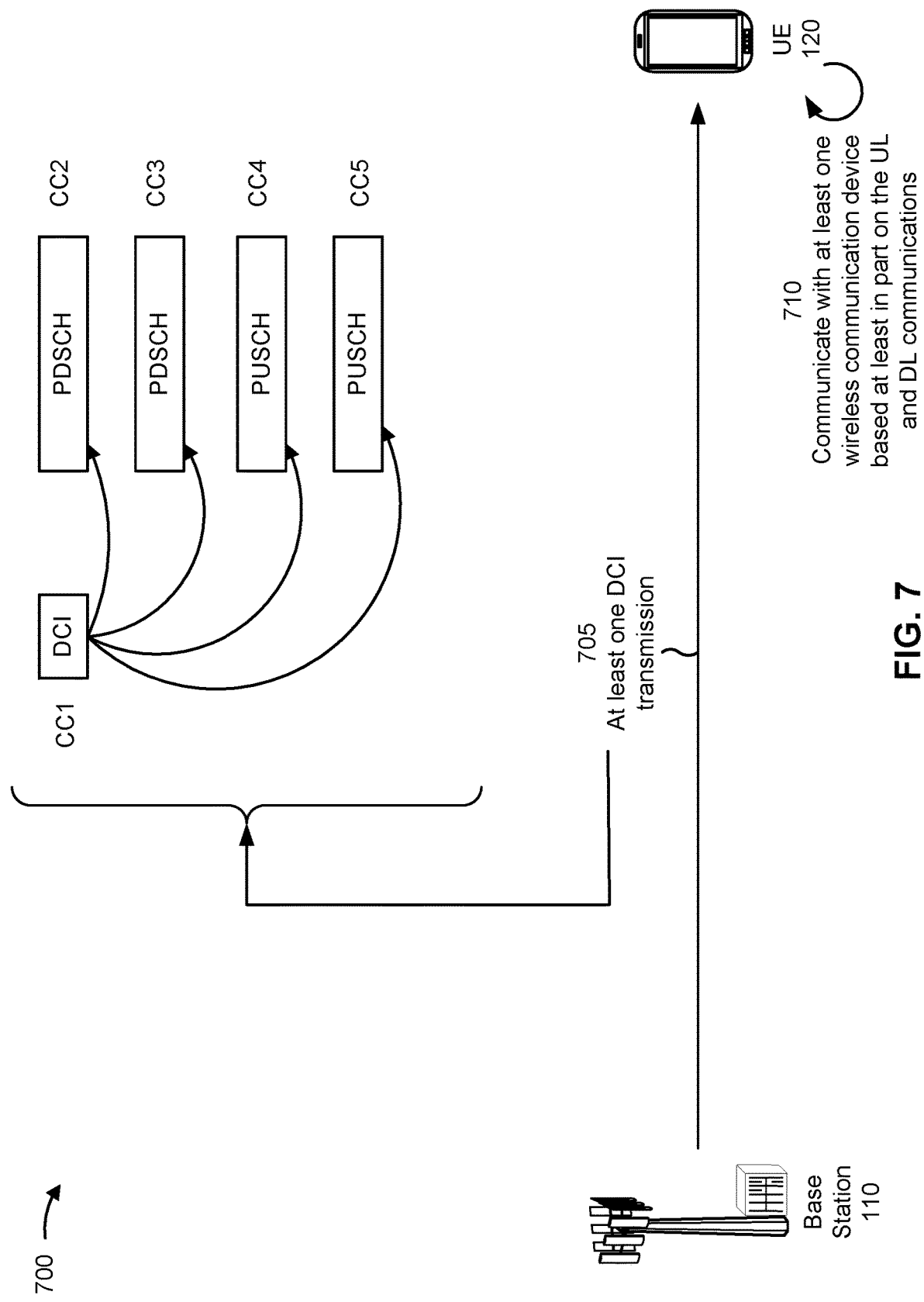

FIG. 7 is a diagram illustrating an example 700 of full duplex uplink and downlink scheduling, in accordance with the present disclosure. As shown in FIG. 7, a base station 110 and a UE 120 may communicate with one another. Example 700 illustrates resource allocation across CCs.

As shown by reference number 705, the base station 110 may transmit, and the UE 120 may receive, at least one DCI transmission for scheduling an uplink communication and a downlink communication. The DCI transmission may schedule communications across multiple CCs. For example, the scheduling DCI may be associated with a first CC (shown as "CC1"), a first scheduled PDSCH may be associated with a second CC (shown as "CC2"), a second scheduled PDSCH may be associated with a third CC (shown as "CC3"), a first scheduled simultaneous PUSCH may be associated with a fourth CC (shown as "CC4"), and a second scheduled simultaneous PUSCH may be associated with a fifth CC (shown as "CC5"). In some aspects, the downlink transmission may be scheduled associated with only one PDSCH and/or the uplink transmission may be associated with only one PUSCH.

In some aspects, the DCI transmission may indicate one or more indexes associated with the CCs. For example, the DCI transmission may indicate a first index associated with the CC1, a second index associated with the CC2, a third index associated with the CC3, a fourth index associated with the CC4, and/or a fifth index associated with the CC5. The multiple CCs for downlink and uplink may be scheduled for the same or different data transmissions and may be associated with the same beam or different beams.

In some aspects, scheduling across CCs may facilitate increased flexibility and/or reliability. For example, CC1 may be an FR1 CC which may provide better reliability than FR2 CCs (e.g., CC2 and CC3). In some aspects, the uplink communication and the downlink communication may be scheduled on the same CC (e.g., CC2 may be CC3). In that case, the uplink and downlink communications may be spatial division multiplexed, partially frequency division multiplexed, and/or fully frequency division multiplexed. In some aspects, the scheduled downlink communication may be a dynamic PDSCH communication or an SPS communication, and the scheduled uplink communication may be a dynamic PUSCH communication or a CG communication. As shown by reference number 710, the UE 120 may communicate with at least one wireless communication device based at least in part on the uplink and downlink communications.

As indicated above, FIG. 7 is provided as an example. Other examples may differ from what is described with respect to FIG. 7.

Figure 8:
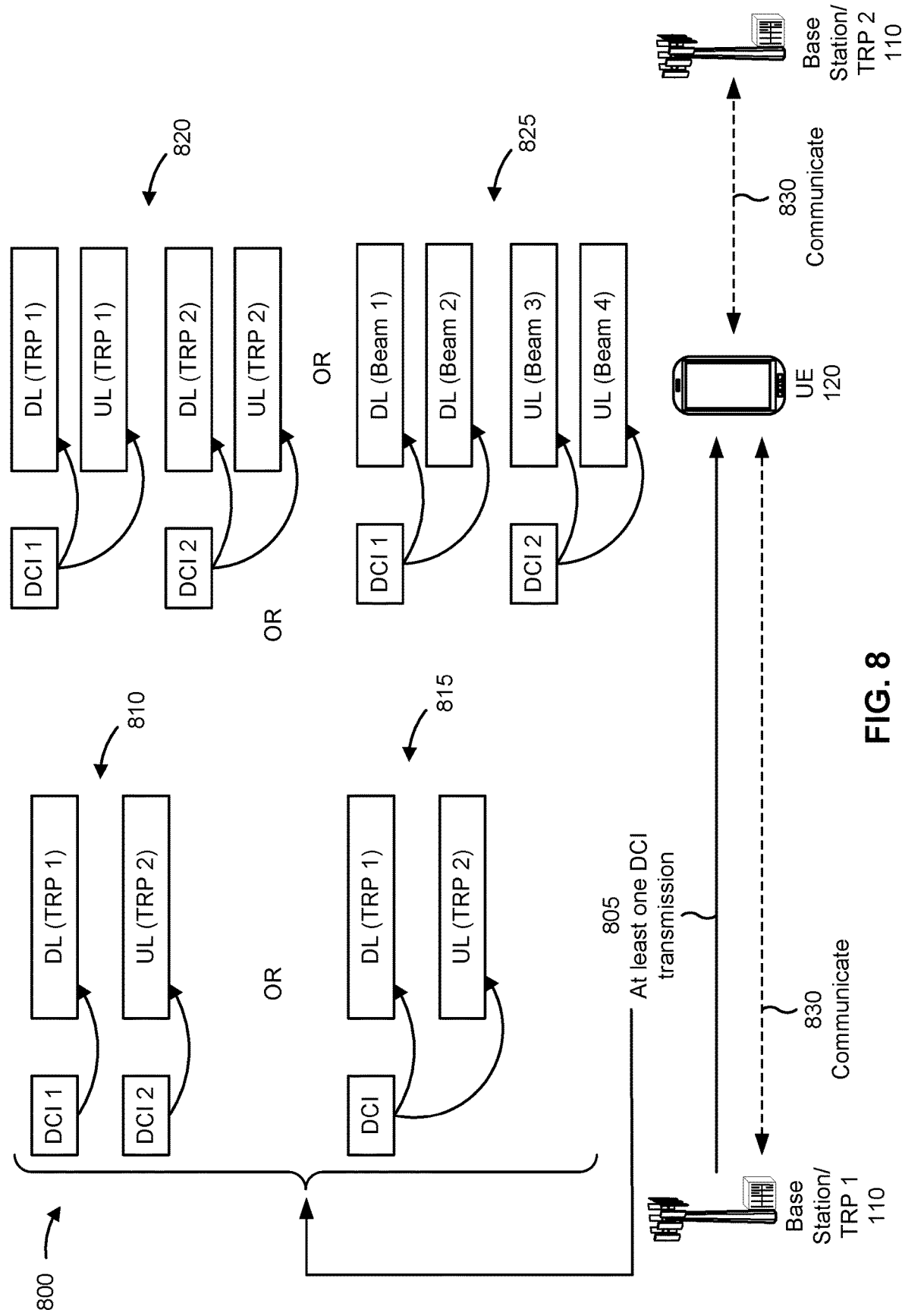

FIG. 8 is a diagram illustrating an example 800 of full duplex uplink and downlink scheduling, in accordance with the present disclosure. As shown in FIG. 8, a base station/TRP 1 110 and a base station/TRP 2 may communicate with a UE 120. Example 800 illustrates full duplex uplink and downlink scheduling in an mTRP scenario.

As show by reference number 805, the base station/TRP 1 110 may transmit, and the UE 120 may receive, at least one DCI transmission for scheduling uplink and downlink communications. As shown by reference number 810, the at least one DCI transmission may include a first DCI transmission (shown as "DCI 1") that indicates a downlink communication associated with a first TRP (e.g., TRP 1) and a second DCI transmission (shown as "DCI 2") that indicates an uplink communication associated with a second TRP (e.g., TRP 2). Although TRP 1 is illustrated as being the base station 110 that provides the scheduling DCI, in some aspects, TRP 1 may be a different device than the base station 110 that provides the scheduling DCI.

As shown by reference number 815, the at least one DCI transmission may include one DCI transmission that schedules a downlink communication associated with a first TRP (e.g., TRP 1) and an uplink communication associated with a second TRP (e.g., TRP 2). As shown by reference number 820, the at least one DCI transmission may include a first DCI transmission (shown as "DCI 1") that schedules a first pair of uplink and downlink communications associated with a first TRP (e.g., TRP 1) and a second DCI transmission (shown as "DCI 2") that schedules a second pair of uplink and downlink communications associated with a second TRP (e.g., TRP 2).

As shown by reference number 825, the at least one DCI transmission may include a first DCI transmission (shown as "DCI 1") that schedules a pair of downlink communications, the first downlink communication associated with a first beam (shown as "Beam 1") and the second downlink communication associated with a second beam (shown as "Beam 2"). The first downlink communication and/or the second downlink communication may be associated with one or more TRPs. For example, the first downlink communication may be associated with a first TRP and the second downlink communication may be associated with a second TRP. In some aspects, the first and second downlink communications may be both be associated with the same TRP.

As shown, the at least one DCI transmission may include a second DCI transmission (shown as "DCI 2") that schedules a first pair of uplink communications, the first uplink communication associated with a third beam (shown as "Beam 3") and the second uplink communication associated with a fourth beam (shown as "Beam 4"). The first uplink communication and/or the second uplink communication may be associated with one or more TRPs. For example, the first uplink communication may be associated with the first TRP (or a third TRP) and the second uplink communication may be associated with the second TRP (or a fourth TRP). In some aspects, the first and second uplink communications may be both be associated with the same TRP.

In some aspects, the at least one DCI transmission of any of the above examples may schedule the uplink and downlink communications on the same or different CCs. In some aspects, each direction (e.g., beam direction) may be associated with a unique CC. In some aspects, more than one CC may be associated with a direction. In some aspects, CCs may be overlapped or disjointed.

As shown by reference number 830, the UE 120 may communicate with the TRP 1 and/or TRP 2 based at least in part on the uplink and downlink communications.

As indicated above, FIG. 8 is provided as an example. Other examples may differ from what is described with respect to FIG. 8.

Figure 9:
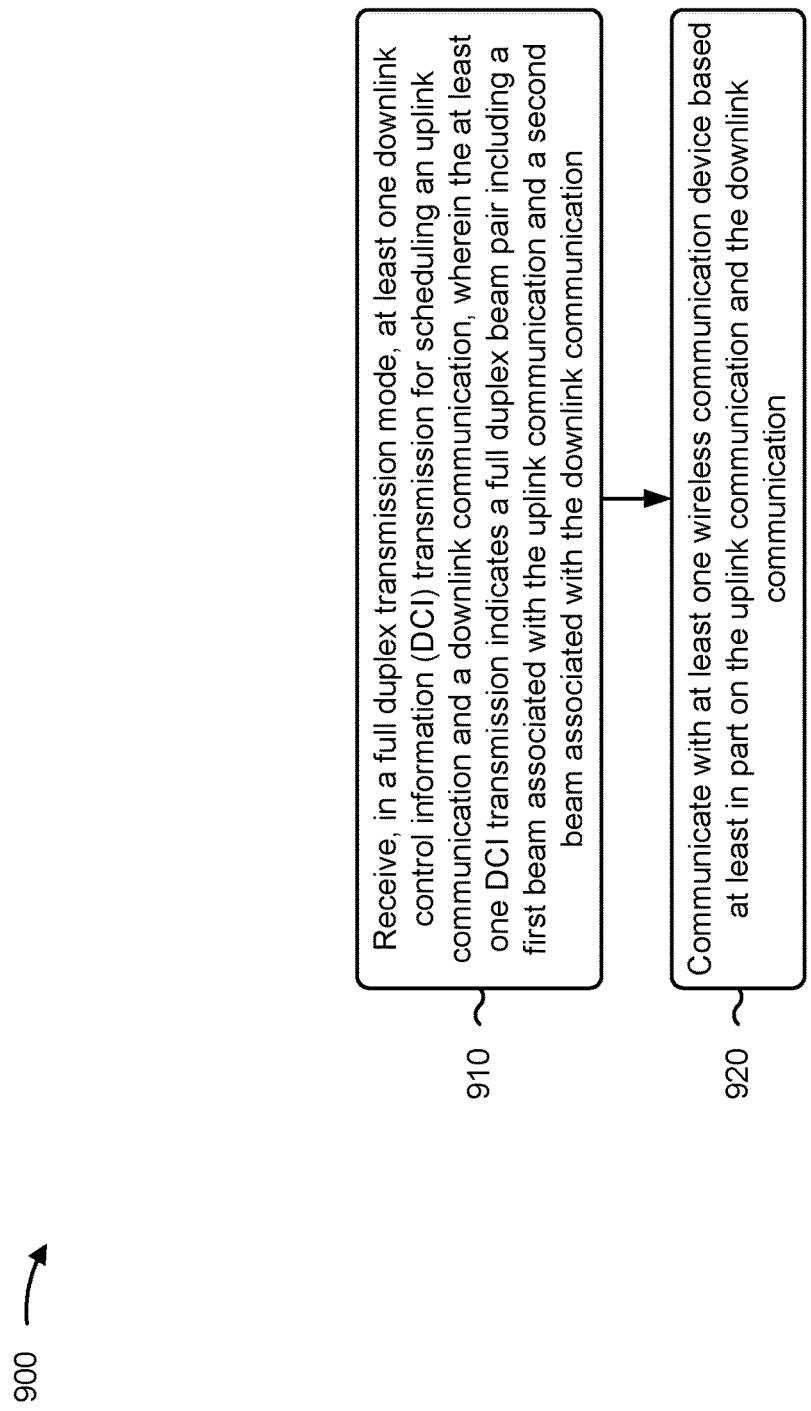
FIGS. 9 and 10 are diagrams illustrating example processes associated with full duplex uplink and downlink scheduling, in accordance with the present disclosure.

FIG. 9 is a diagram illustrating an example process 900 performed, for example, by a UE, in accordance with the present disclosure. Example process 900 is an example where the UE (e.g., UE 120) performs operations associated with FD UL and DL scheduling.

As shown in FIG. 9, in some aspects, process 900 may include receiving, in an FD transmission mode, at least one DCI transmission for scheduling a UL communication and a DL communication, wherein the at least one DCI transmission indicates an FD beam pair including a first beam associated with the UL communication and a second beam associated with the DL communication (block 910). For example, the UE (e.g., using reception component 1102, depicted in FIG. 11) may receive, in a full duplex transmission mode, at least one DCI transmission for scheduling an uplink communication and a downlink communication, wherein the at least one DCI transmission indicates a full duplex beam pair including a first beam associated with the uplink communication and a second beam associated with the downlink communication, as described above.

As further shown in FIG. 9, in some aspects, process 900 may include communicating with at least one wireless communication device based at least in part on the uplink communication and the downlink communication (block 920). For example, the UE (e.g., using reception component 1102 and/or transmission component 1104, depicted in FIG. 11) may communicate with at least one wireless communication device based at least in part on the uplink communication and the downlink communication, as described above.

Process 900 may include additional aspects, such as any single aspect or any combination of aspects described below and/or in connection with one or more other processes described elsewhere herein.

In a first aspect, the at least one DCI transmission comprises a first DCI transmission associated with the uplink communication that indicates at least the first beam, and a second DCI transmission associated with the downlink communication that indicates at least the second beam.

In a second aspect, the at least one DCI transmission comprises one DCI transmission that is associated with the uplink communication and the downlink communication, wherein the one DCI transmission indicates a full duplex beam pair, wherein the one DCI transmission comprises a dedicated DCI format or a modified DCI format.

In a third aspect, alone or in combination with one or more of the first and second aspects, the uplink communication comprises a PUSCH communication, and the downlink communication comprises a PDSCH communication.

In a fourth aspect, alone or in combination with one or more of the first through third aspects, the uplink communication is associated with a CG allocation, and the downlink communication is associated with an SPS allocation.

In a fifth aspect, alone or in combination with the fourth aspect, the at least one DCI communication activates the configured grant allocation or the SPS allocation, and the at least one DCI communication indicates resources associated with a PUSCH or a PDSCH.

In a sixth aspect, alone or in combination with one or more of the first through fifth aspects, the at least one DCI transmission is fully duplexed with an uplink signal.

In a seventh aspect, alone or in combination with one or more of the first through sixth aspects, the at least one DCI indicates a first CC associated with the uplink communication and a second CC associated with the downlink communication.

In an eighth aspect, alone or in combination with the seventh aspect, the at least one DCI transmission is associated with a third CC.

In a ninth aspect, alone or in combination with the seventh aspect, the first CC is the second CC, and the uplink communication and the downlink communication are spatially division multiplexed, partially frequency division multiplexed, or frequency division multiplexed.

In a tenth aspect, alone or in combination with one or more of the seventh through ninth aspects, the uplink communication is further associated with a third CC.

In an eleventh aspect, alone or in combination with the tenth aspect, the downlink communication is further associated with a fourth CC.

In a twelfth aspect, alone or in combination with one or more of the seventh through eleventh aspects, the first CC is the second CC, overlaps the second CC, or is disjointed from the second CC.

In a thirteenth aspect, alone or in combination with one or more of the first through twelfth aspects, the uplink communication is an uplink communication to a first TRP of a plurality of TRPs, and the downlink communication is a downlink communication from a second TRP of the plurality of TRPs.

In a fourteenth aspect, alone or in combination with the thirteenth aspect, the at least one DCI transmission comprises a first DCI transmission that indicates the uplink communication and the downlink communication, and a second DCI transmission that indicates an additional uplink communication and an additional downlink communication, wherein the additional uplink communication is associated with the first TRP or a third TRP of the plurality of TRPs, and wherein the additional downlink communication is associated with the second TRP or a fourth TRP of the plurality of TRPs.

In a fifteenth aspect, alone or in combination with the thirteenth aspect, the at least one DCI transmission comprises a first DCI transmission that indicates the uplink communication and an additional uplink communication associated with the first TRP, and a second DCI transmission that indicates the downlink communication and an additional downlink communication associated with the second TRP.

In a sixteenth aspect, alone or in combination with one or more of the first through fifteenth aspects, the uplink communication is an uplink communication to a first TRP of a plurality of TRPs, and the downlink communication is a downlink communication from the first TRP.

In a seventeenth aspect, alone or in combination with the sixteenth aspect, the at least one DCI transmission comprises a first DCI transmission that indicates the uplink communication and the downlink communication, and a second DCI transmission that indicates an additional uplink communication and an additional downlink communication, wherein the additional uplink communication is associated with a second TRP of the plurality of TRPs, and wherein the additional downlink communication is associated with the second TRP.

In an eighteenth aspect, alone or in combination with one or more of the first through seventeenth aspects, the at least one DCI transmission indicates at least one repetition of the uplink communication and at least one repetition of the downlink communication.

In a nineteenth aspect, alone or in combination with the eighteenth aspect, the at least one DCI transmission indicates a beam sweeping procedure associated with at least one of the at least one repetition of the uplink communication and the at least one repetition of the downlink communication.

In a twentieth aspect, alone or in combination with one or more of the eighteenth through nineteenth aspects, a first repetition of the at least one repetition of the uplink communication is associated with a first beam, a second repetition of the at least one repetition of the uplink communication is associated with a second beam, a first repetition of the at least one repetition of the downlink communication is associated with a third beam that is paired with the first beam, and a second repetition of the at least one repetition of the downlink communication is associated with a fourth beam that is paired with the second beam.

In a twenty-first aspect, alone or in combination with the twentieth aspect, the third beam is the fourth beam.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
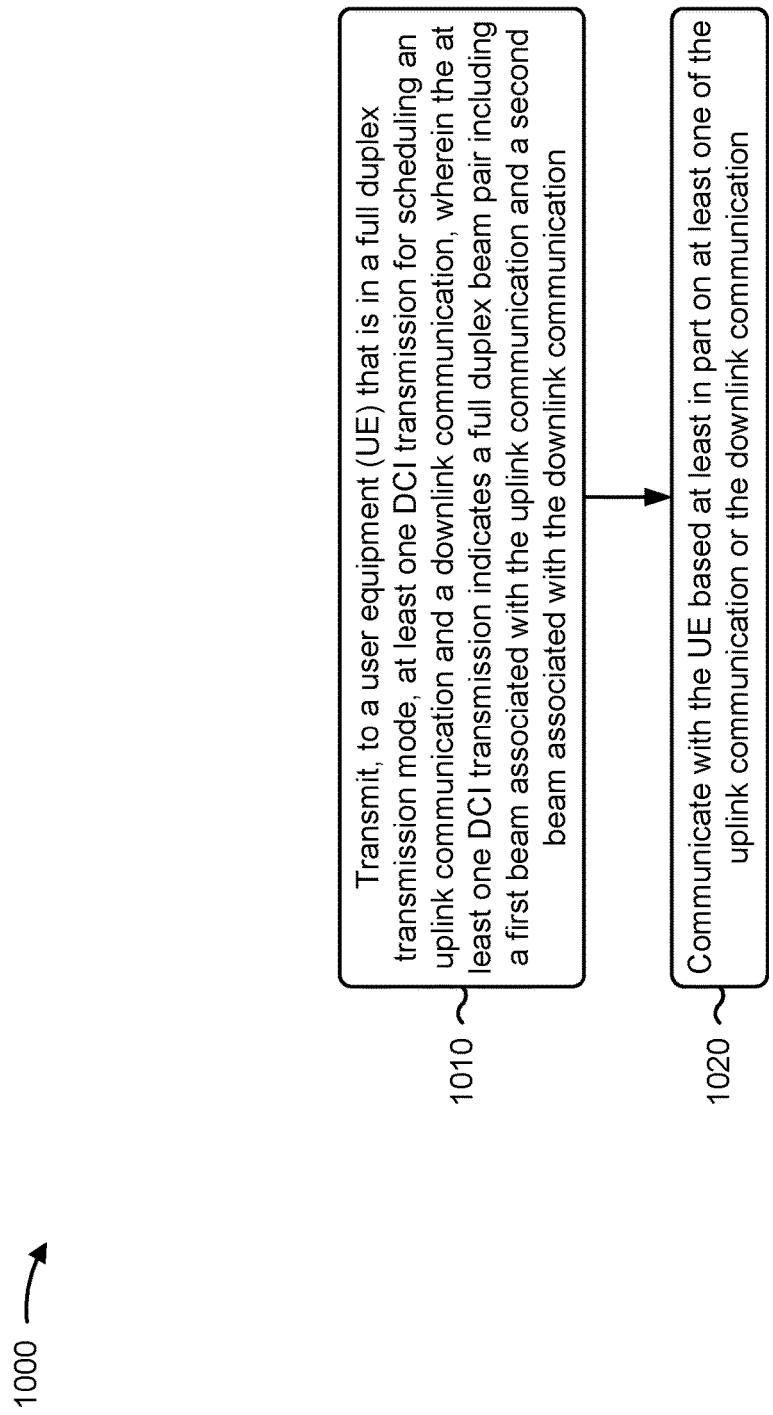

FIG. 10 is a diagram illustrating an example process 1000 performed, for example, by a base station, in accordance with the present disclosure. Example process 1000 is an example where the base station (e.g., base station 110) performs operations associated with full duplex uplink and downlink scheduling.

As shown in FIG. 10, in some aspects, process 1000 may include transmitting, to a UE that is in a full duplex transmission mode, at least one DCI transmission for scheduling an uplink communication and a downlink communication, wherein the at least one DCI transmission indicates a full duplex beam pair including a first beam associated with the uplink communication and a second beam associated with the downlink communication (block 1010). For example, the base station (e.g., using transmission component 1204, depicted in FIG. 12) may transmit, to a UE that is in a full duplex transmission mode, at least one DCI transmission for scheduling an uplink communication and a downlink communication, wherein the at least one DCI transmission indicates a full duplex beam pair including a first beam associated with the uplink communication and a second beam associated with the downlink communication, as described above.

As further shown in FIG. 10, in some aspects, process 1000 may include communicating with the UE based at least in part on at least one of the uplink communication or the downlink communication (block 1020). For example, the base station (e.g., using reception component 1202 and/or transmission component 1204, depicted in FIG. 12) may communicate with the UE based at least in part on at least one of the uplink communication or the downlink communication, as described above.

Process 1000 may include additional aspects, such as any single aspect or any combination of aspects described below and/or in connection with one or more other processes described elsewhere herein.

In a first aspect, the at least one DCI transmission comprises a first DCI transmission associated with the uplink communication that indicates at least the first beam, and a second DCI transmission associated with the downlink communication that indicates at least the second beam.

In a second aspect, the at least one DCI transmission comprises one DCI transmission that is associated with the uplink communication and the downlink communication, wherein the one DCI transmission indicates a full duplex beam pair, and wherein the one DCI transmission comprises a dedicated DCI format or a modified DCI format.

In a third aspect, alone or in combination with one or more of the first and second aspects, the uplink communication comprises a PUSCH communication, and the downlink communication comprises a PDSCH communication.

In a fourth aspect, alone or in combination with one or more of the first through third aspects, the uplink communication is associated with a CG allocation, and the downlink communication is associated with an SPS allocation.

In a fifth aspect, alone or in combination with the fourth aspect, the at least one DCI communication activates the configured grant allocation or the SPS allocation, and the at least one DCI communication indicates resources associated with a PUSCH or a PDSCH.

In a sixth aspect, alone or in combination with one or more of the first through fifth aspects, the at least one DCI transmission is fully duplexed with an uplink signal.

In a seventh aspect, alone or in combination with one or more of the first through sixth aspects, the at least one DCI indicates a first CC associated with the uplink communication and a second CC associated with the downlink communication.

In an eighth aspect, alone or in combination with the seventh aspect, the at least one DCI transmission is associated with a third CC.

In a ninth aspect, alone or in combination with the seventh aspect, the first CC is the second CC, and the uplink communication and the downlink communication are spatially division multiplexed, partially frequency division multiplexed, or frequency division multiplexed.

In a tenth aspect, alone or in combination with one or more of the seventh through ninth aspects, the uplink communication is further associated with a third CC.

In an eleventh aspect, alone or in combination with the tenth aspect, the downlink communication is further associated with a fourth CC.

In a twelfth aspect, alone or in combination with one or more of the seventh through eleventh aspects, the first CC is the second CC, overlaps the second CC, or is disjointed from the second CC.

In a thirteenth aspect, alone or in combination with one or more of the first through twelfth aspects, the uplink communication is an uplink communication to a first TRP of a plurality of TRPs, and the downlink communication is a downlink communication from a second TRP of the plurality of TRPs.

In a fourteenth aspect, alone or in combination with the thirteenth aspect, the base station is the first TRP or the second TRP.

In a fifteenth aspect, alone or in combination with one or more of the thirteenth through fourteenth aspects, the at least one DCI transmission comprises a first DCI transmission that indicates the uplink communication and the downlink communication, and a second DCI transmission that indicates an additional uplink communication and an additional downlink communication, wherein the additional uplink communication is associated with the first TRP or a third TRP of the plurality of TRPs, and wherein the additional downlink communication is associated with the second TRP or a fourth TRP of the plurality of TRPs.

In a sixteenth aspect, alone or in combination with one or more of the thirteenth through fourteenth aspects, the at least one DCI transmission comprises a first DCI transmission that indicates the uplink communication and an additional uplink communication associated with the first TRP, and a second DCI transmission that indicates the downlink communication and an additional downlink communication associated with the second TRP.

In a seventeenth aspect, alone or in combination with one or more of the first through sixteenth aspects, the uplink communication is an uplink communication to a first TRP of a plurality of TRPs, and the downlink communication is a downlink communication from the first TRP.

In an eighteenth aspect, alone or in combination with the seventeenth aspect, the base station is the first TRP or the second TRP.

In a nineteenth aspect, alone or in combination with one or more of the seventeenth through eighteenth aspects, the at least one DCI transmission comprises a first DCI transmission that indicates the uplink communication and the downlink communication, and a second DCI transmission that indicates an additional uplink communication and an additional downlink communication, wherein the additional uplink communication is associated with a second TRP of the plurality of TRPs, and wherein the additional downlink communication is associated with the second TRP.

In a twentieth aspect, alone or in combination with one or more of the first through nineteenth aspects, the at least one DCI transmission indicates at least one repetition of the uplink communication and at least one repetition of the downlink communication.

In a twenty-first aspect, alone or in combination with the twentieth aspect, the at least one DCI transmission indicates a beam sweeping procedure associated with at least one of the at least one repetition of the uplink communication and the at least one repetition of the downlink communication.

In a twenty-second aspect, alone or in combination with one or more of the twentieth through twenty-first aspects, a first repetition of the at least one repetition of the uplink communication is associated with a first beam, a second repetition of the at least one repetition of the uplink communication is associated with a second beam, a first repetition of the at least one repetition of the downlink communication is associated with a third beam that is paired with the first beam, and a second repetition of the at least one repetition of the downlink communication is associated with a fourth beam that is paired with the second beam.

In a twenty-third aspect, alone or in combination with the twenty-second aspect, the third beam is the fourth beam.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
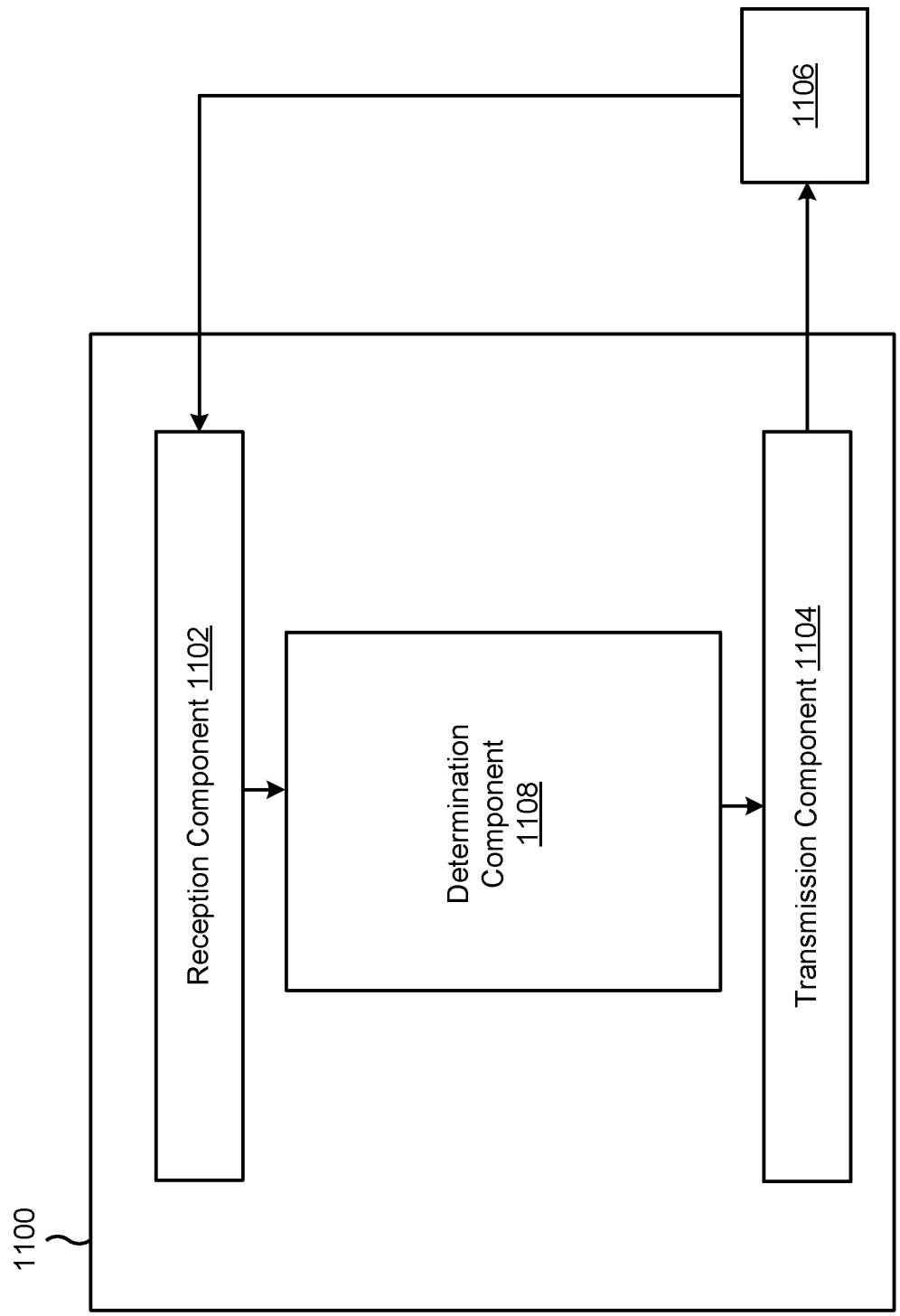
FIGS. 11 and 12 are block diagrams of example apparatuses for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a determination component 1108.

In some aspects, the apparatus 1100 may be configured to perform one or more operations described herein in connection with FIGS. 4-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The reception component 1102 may receive, in a full duplex transmission mode, at least one DCI transmission for scheduling an uplink communication and a downlink communication, wherein the at least one DCI transmission indicates a full duplex beam pair including a first beam associated with the uplink communication and a second beam associated with the downlink communication. The reception component 1102 and/or the transmission component 1104 may communicate with at least one wireless communication device based at least in part on the uplink communication and the downlink communication.

The determination component 1108 may determine beams to use for communications based at least in part on indications carried in the DCI transmission for scheduling the uplink and downlink communications. The determination component 1108 may determine self-interference measurements, outside interference measurements, and/or communication resources to use, among other examples. In some aspects, the determination component 1108 may include a controller/processor, a memory, or a combination thereof, of the UE described above in connection with FIG. 2. In some aspects, the determination component 1108 may include the reception component 1102 and/or the transmission component 1104.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
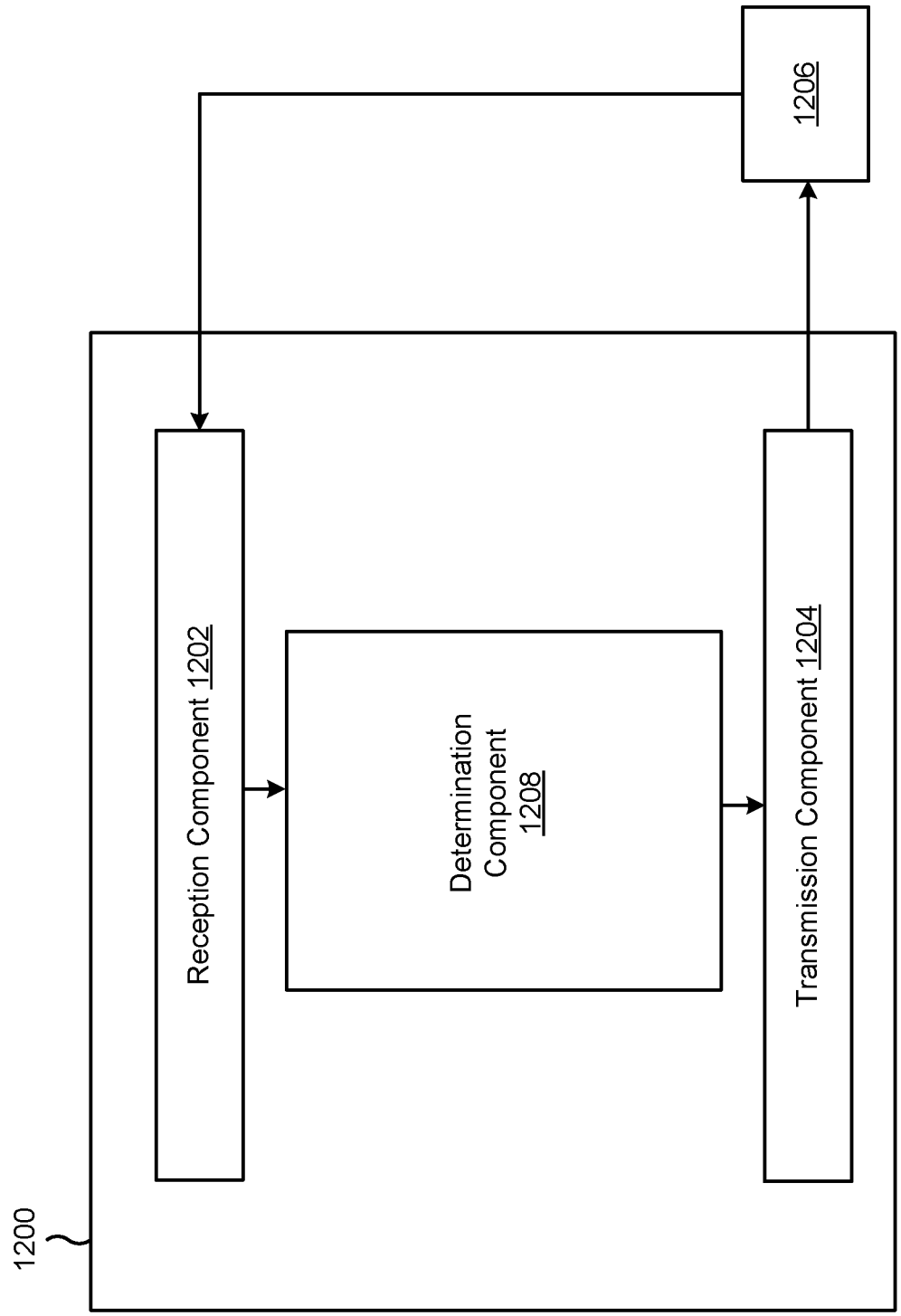

FIG. 12 is a block diagram of an example apparatus 1200 for wireless communication. The apparatus 1200 may be a base station, or a base station may include the apparatus 1200. The apparatus 1200 may be a TRP, or a TRP may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a determination component 1208.

In some aspects, the apparatus 1200 may be configured to perform one or more operations described herein in connection with FIGS. 4-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The transmission component 1204 may transmit, to a UE that is in a full duplex transmission mode, at least one DCI transmission for scheduling an uplink communication and a downlink communication, wherein the at least one DCI transmission indicates a full duplex beam pair including a first beam associated with the uplink communication and a second beam associated with the downlink communication. The reception component 1202 and/or the transmission component 1204 may communicate with the UE based at least in part on at least one of the uplink communication or the downlink communication.

The determination component 1208 may determine beam pairs to use for communications, resource allocations, and/or configurations, among other examples. The determination component 1208 may determine self-interference measurements, outside interference measurements, and/or communication resources to use, among other examples. In some aspects, the determination component 1208 may include a controller/processor, a memory, or a combination thereof, of the base station described above in connection with FIG. 2. In some aspects, the determination component 1208 may include the reception component 1202 and/or the transmission component 1204.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, in a full duplex transmission mode, at least one downlink control information (DCI) transmission for scheduling an uplink communication and a downlink communication, wherein the at least one DCI transmission indicates a full duplex beam pair including a first beam associated with the uplink communication and a second beam associated with the downlink communication; and communicating with at least one wireless communication device based at least in part on the uplink communication and the downlink communication.

Aspect 2: The method of Aspect 1, wherein the at least one DCI transmission comprises: a first DCI transmission associated with the uplink communication that indicates at least the first beam, and a second DCI transmission associated with the downlink communication that indicates at least the second beam.

Aspect 3: The method of Aspect 1, wherein the at least one DCI transmission comprises one DCI transmission that is associated with the uplink communication and the downlink communication, wherein the one DCI transmission indicates a full duplex beam pair, wherein the one DCI transmission comprises a dedicated DCI format or a modified DCI format.

Aspect 4: The method of any of Aspects 1-3, wherein the uplink communication comprises a physical uplink shared channel communication, and wherein the downlink communication comprises a physical downlink shared channel communication.

Aspect 5: The method of any of Aspects 1-4, wherein the uplink communication is associated with a configured grant (CG) allocation, and wherein the downlink communication is associated with a semi-persistent scheduling (SPS) allocation.

Aspect 6: The method of Aspect 5, wherein the at least one DCI communication activates the configured grant allocation or the SPS allocation, and wherein the at least one DCI communication indicates resources associated with a physical uplink shared channel or a physical downlink shared channel.

Aspect 7: The method of any of Aspects 1-6, wherein the at least one DCI transmission is fully duplexed with an uplink signal.

Aspect 8: The method of any of Aspects 1-7, wherein the at least one DCI indicates a first component carrier (CC) associated with the uplink communication and a second CC associated with the downlink communication.

Aspect 9: The method of Aspect 8, wherein the at least one DCI transmission is associated with a third CC.

Aspect 10: The method of Aspect 8, wherein the first CC is the second CC, and wherein the uplink communication and the downlink communication are spatially division multiplexed, partially frequency division multiplexed, or frequency division multiplexed.

Aspect 11: The method of any of Aspects 8-10, wherein the uplink communication is further associated with a third CC.

Aspect 12: The method of Aspect 11, wherein the downlink communication is further associated with a fourth CC.

Aspect 13: The method of any of Aspects 8-12, wherein the first CC is the second CC, overlaps the second CC, or is disjointed from the second CC.

Aspect 14: The method of any of Aspects 1-13, wherein the uplink communication is an uplink communication to a first transmit-receive point (TRP) of a plurality of TRPs, and wherein the downlink communication is a downlink communication from a second TRP of the plurality of TRPs.

Aspect 15: The method of Aspect 14, wherein the at least one DCI transmission comprises: a first DCI transmission that indicates the uplink communication and the downlink communication, and a second DCI transmission that indicates an additional uplink communication and an additional downlink communication, wherein the additional uplink communication is associated with the first TRP or a third TRP of the plurality of TRPs, and wherein the additional downlink communication is associated with the second TRP or a fourth TRP of the plurality of TRPs.

Aspect 16: The method of any of Aspects 1-13, wherein the uplink communication is an uplink communication to a first transmit-receive point (TRP) of a plurality of TRPs, and wherein the downlink communication is a downlink communication from the first TRP.

Aspect 17: The method of Aspect 16, wherein the at least one DCI transmission comprises: a first DCI transmission that indicates the uplink communication and the downlink communication, and a second DCI transmission that indicates an additional uplink communication and an additional downlink communication, wherein the additional uplink communication is associated with a second TRP of the plurality of TRPs, and wherein the additional downlink communication is associated with the second TRP.

Aspect 18: The method of Aspect 16, wherein the at least one DCI transmission comprises: a first DCI transmission that indicates the uplink communication and an additional uplink communication associated with the first TRP; and a second DCI transmission that indicates the downlink communication and an additional downlink communication associated with the second TRP.

Aspect 19: The method of any of Aspects 1-18, wherein the at least one DCI transmission indicates at least one repetition of the uplink communication and at least one repetition of the downlink communication.

Aspect 20: The method of Aspect 19, wherein the at least one DCI transmission indicates a beam sweeping procedure associated with at least one of the at least one repetition of the uplink communication and the at least one repetition of the downlink communication.

Aspect 21: The method of either of Aspects 19 or 20, wherein a first repetition of the at least one repetition of the uplink communication is associated with a first beam, wherein a second repetition of the at least one repetition of the uplink communication is associated with a second beam, wherein a first repetition of the at least one repetition of the downlink communication is associated with a third beam that is paired with the first beam, and wherein a second repetition of the at least one repetition of the downlink communication is associated with a fourth beam that is paired with the second beam.

Aspect 22: The method of Aspect 21, wherein the third beam is the fourth beam.

Aspect 23: A method of wireless communication performed by a base station, comprising: transmitting, to a user equipment (UE) that is in a full duplex transmission mode, at least one downlink control information (DCI) transmission for scheduling an uplink communication and a downlink communication, wherein the at least one DCI transmission indicates a full duplex beam pair including a first beam associated with the uplink communication and a second beam associated with the downlink communication; and communicating with the UE based at least in part on at least one of the uplink communication or the downlink communication.

Aspect 24: The method of Aspect 23, wherein the at least one DCI transmission comprises: a first DCI transmission associated with the uplink communication that indicates at least the first beam, and a second DCI transmission associated with the downlink communication that indicates at least the second beam.

Aspect 25: The method of Aspect 23, wherein the at least one DCI transmission comprises one DCI transmission that is associated with the uplink communication and the downlink communication, wherein the one DCI transmission indicates a full duplex beam pair, wherein the one DCI transmission comprises a dedicated DCI format or a modified DCI format.

Aspect 26: The method of any of Aspects 23-25, wherein the uplink communication comprises a physical uplink shared channel communication, and wherein the downlink communication comprises a physical downlink shared channel communication.

Aspect 27: The method of any of Aspects 23-26, wherein the uplink communication is associated with a configured grant (CG) allocation, and wherein the downlink communication is associated with a semi-persistent scheduling (SPS) allocation.

Aspect 28: The method of Aspect 27, wherein the at least one DCI communication activates the configured grant allocation or the SPS allocation, and wherein the at least one DCI communication indicates resources associated with a physical uplink shared channel or a physical downlink shared channel.

Aspect 29: The method of any of Aspects 23-28, wherein the at least one DCI transmission is fully duplexed with an uplink signal.

Aspect 30: The method of any of Aspects 23-29, wherein the at least one DCI indicates a first component carrier (CC) associated with the uplink communication and a second CC associated with the downlink communication.

Aspect 31: The method of Aspect 30, wherein the at least one DCI transmission is associated with a third CC.

Aspect 32: The method of Aspect 30, wherein the first CC is the second CC, and wherein the uplink communication and the downlink communication are spatially division multiplexed, partially frequency division multiplexed, or frequency division multiplexed.

Aspect 33: The method of any of Aspects 30-32, wherein the uplink communication is further associated with a third CC.

Aspect 34: The method of Aspect 33, wherein the downlink communication is further associated with a fourth CC.

Aspect 35: The method of any of Aspects 30-34, wherein the first CC is the second CC, overlaps the second CC, or is disjointed from the second CC.

Aspect 36: The method of any of Aspects 23-35, wherein the uplink communication is an uplink communication to a first transmit-receive point (TRP) of a plurality of TRPs, and wherein the downlink communication is a downlink communication from a second TRP of the plurality of TRPs.

Aspect 37: The method of Aspect 36, wherein the base station is the first TRP or the second TRP.

Aspect 38: The method of either of Aspects 36 or 37, wherein the at least one DCI transmission comprises: a first DCI transmission that indicates the uplink communication and the downlink communication, and a second DCI transmission that indicates an additional uplink communication and an additional downlink communication, wherein the additional uplink communication is associated with the first TRP or a third TRP of the plurality of TRPs, and wherein the additional downlink communication is associated with the second TRP or a fourth TRP of the plurality of TRPs.

Aspect 39: The method of either of Aspects 36 or 37, wherein the at least one DCI transmission comprises: a first DCI transmission that indicates the uplink communication and an additional uplink communication associated with the first TRP; and a second DCI transmission that indicates the downlink communication and an additional downlink communication associated with the second TRP.

Aspect 40: The method of any of Aspects 23-39, wherein the uplink communication is an uplink communication to a first transmit-receive point (TRP) of a plurality of TRPs, and wherein the downlink communication is a downlink communication from the first TRP.

Aspect 41: The method of Aspect 40, wherein the base station is the first TRP or the second TRP.

Aspect 42: The method of either of Aspects 40 or 41, wherein the at least one DCI transmission comprises: a first DCI transmission that indicates the uplink communication and the downlink communication, and a second DCI transmission that indicates an additional uplink communication and an additional downlink communication, wherein the additional uplink communication is associated with a second TRP of the plurality of TRPs, and wherein the additional downlink communication is associated with the second TRP.

Aspect 43: The method of any of Aspects 23-42, wherein the at least one DCI transmission indicates at least one repetition of the uplink communication and at least one repetition of the downlink communication.

Aspect 44: The method of Aspect 43, wherein the at least one DCI transmission indicates a beam sweeping procedure associated with at least one of the at least one repetition of the uplink communication and the at least one repetition of the downlink communication.

Aspect 45: The method of either of Aspects 43 or 44, wherein a first repetition of the at least one repetition of the uplink communication is associated with a first beam, wherein a second repetition of the at least one repetition of the uplink communication is associated with a second beam, wherein a first repetition of the at least one repetition of the downlink communication is associated with a third beam that is paired with the first beam, and wherein a second repetition of the at least one repetition of the downlink communication is associated with a fourth beam that is paired with the second beam.

Aspect 46: The method of Aspect 45, wherein the third beam is the fourth beam.

Aspect 47: An apparatus for wireless communication at a device, comprising a processor; memory coupled with the processor; and instructions stored in the memory and executable by the processor to cause the apparatus to perform the method of one or more Aspects of Aspects 1-22.

Aspect 48: A device for wireless communication, comprising a memory and one or more processors coupled to the memory, the memory and the one or more processors configured to perform the method of one or more Aspects of Aspects 1-22.

Aspect 49: An apparatus for wireless communication, comprising at least one means for performing the method of one or more Aspects of Aspects 1-22.

Aspect 50: A non-transitory computer-readable medium storing code for wireless communication, the code comprising instructions executable by a processor to perform the method of one or more Aspects of Aspects 1-22.

Aspect 51: A non-transitory computer-readable medium storing a set of instructions for wireless communication, the set of instructions comprising one or more instructions that, when executed by one or more processors of a device, cause the device to perform the method of one or more Aspects of Aspects 1-22.

Aspect 52: An apparatus for wireless communication at a device, comprising a processor; memory coupled with the processor; and instructions stored in the memory and executable by the processor to cause the apparatus to perform the method of one or more Aspects of Aspects 23-46.

Aspect 53: A device for wireless communication, comprising a memory and one or more processors coupled to the memory, the memory and the one or more processors configured to perform the method of one or more Aspects of Aspects 23-46.

Aspect 54: An apparatus for wireless communication, comprising at least one means for performing the method of one or more Aspects of Aspects 23-46.

Aspect 55: A non-transitory computer-readable medium storing code for wireless communication, the code comprising instructions executable by a processor to perform the method of one or more Aspects of Aspects 23-46.

Aspect 56: A non-transitory computer-readable medium storing a set of instructions for wireless communication, the set of instructions comprising one or more instructions that, when executed by one or more processors of a device, cause the device to perform the method of one or more Aspects of Aspects 23-46.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   receive, in a full duplex transmission mode, at least one downlink control information (DCI) transmission for scheduling an uplink communication and a downlink communication, wherein the at least one DCI transmission indicates a full duplex beam pair including a first beam associated with the uplink communication and a second beam associated with the downlink communication, the at least one DCI transmission comprising: a first DCI transmission that indicates the uplink communication and the downlink communication, and a second DCI transmission that indicates an additional uplink communication and an additional downlink communication; and
   communicate with at least one wireless communication device based at least in part on the uplink communication and the downlink communication
   wherein the uplink communication is an uplink communication to a first transmit-receive point (TRP) of a plurality of TRPs, and wherein the downlink communication is a downlink communication from a second TRP of the plurality of TRPs; and
   wherein the additional uplink communication is associated with the first TRP or a third TRP of the plurality of TRPs, and wherein the additional downlink communication is associated with the second TRP or a fourth TRP of the plurality of TRPs.

2. The UE of claim 1, wherein the second DCI transmission is associated with the additional downlink communication that indicates at least the second beam.

3. The UE of claim 1, wherein the first DCI transmission is associated with the uplink communication and the downlink communication, and wherein the first DCI transmission indicates the full duplex beam pair, and wherein the first DCI transmission comprises a dedicated DCI format or a modified DCI format.

4. The UE of claim 1, wherein the uplink communication comprises a physical uplink shared channel communication and wherein the downlink communication comprises a physical downlink shared channel communication.

5. The UE of claim 1, wherein the uplink communication is associated with a configured grant (CG) allocation, and wherein the downlink communication is associated with a semi-persistent scheduling (SPS) allocation.

6. The UE of claim 5, wherein the at least one DCI transmission activates the CG allocation or the SPS allocation, and wherein the at least one DCI transmission indicates resources associated with a physical uplink shared channel or a physical downlink shared channel.

7. The UE of claim 1, wherein the at least one DCI transmission is fully duplexed with an uplink signal.

8. The UE of claim 1, wherein the at least one DCI transmission indicates a first component carrier (CC) associated with the uplink communication and a second CC associated with the downlink communication.

9. The UE of claim 8, wherein the at least one DCI transmission is associated with a third CC.

10. The UE of claim 8, wherein the first CC is the second CC, and wherein the uplink communication and the downlink communication are spatially division multiplexed, partially frequency division multiplexed, or frequency division multiplexed.

11. The UE of claim 8, wherein the uplink communication is further associated with a third CC.

12. The UE of claim 11, wherein the downlink communication is further associated with a fourth CC.

13. The UE of claim 8, wherein the first CC is the second CC, overlaps the second CC, or is disjointed from the second CC.

14. The UE of claim 1, wherein the at least one DCI transmission indicates at least one repetition of the uplink communication and at least one repetition of the downlink communication.

15. The UE of claim 14, wherein the at least one DCI transmission indicates a beam sweeping procedure associated with at least one of:
the at least one repetition of the uplink communication, and
the at least one repetition of the downlink communication.

16. The UE of claim 15,
wherein a first repetition of the at least one repetition of the uplink communication is associated with the first beam, and wherein a second repetition of the at least one repetition of the uplink communication is associated with a third beam,
wherein a first repetition of the at least one repetition of the downlink communication is associated with the second beam that is paired with the first beam, and wherein a second repetition of the at least one repetition of the downlink communication is associated with a fourth beam that is paired with the third beam.

17. The UE of claim 16, wherein the third beam comprises the first beam.

18. A network entity for wireless communication, comprising:
a memory; and
one or more processors, coupled to the memory, configured to:
transmit, to a user equipment (UE) that is in a full duplex transmission mode, at least one downlink control information (DCI) transmission for scheduling an uplink communication and a downlink communication, wherein the at least one DCI transmission indicates a full duplex beam pair including a first beam associated with the uplink communication and a second beam associated with the downlink communication, the at least one DCI transmission comprising: a first DCI transmission that indicates the uplink communication and the downlink communication, and a second DCI transmission that indicates an additional uplink communication and an additional downlink communication; and
communicate with the UE based at least in part on the uplink communication and the downlink communication;
wherein the uplink communication is an uplink communication to a first transmit- receive point (TRP) of a plurality of TRPs, and wherein the downlink communication is a downlink communication from a second TRP of the plurality of TRPs; and
wherein the additional uplink communication is associated with the first TRP or a third TRP of the plurality of TRPs, and wherein the additional downlink communication is associated with the second TRP or a fourth TRP of the plurality of TRPs.

19. The network entity of claim 18, wherein the second DCI transmission is associated with the downlink communication that indicates at least the second beam.

20. The network entity of claim 18, wherein the first DCI transmission indicates the full duplex beam pair, and wherein the first DCI transmission comprises a dedicated DCI format or a modified DCI format.

21. The network entity of claim 18, wherein the uplink communication is associated with a configured grant (CG) allocation, and wherein the downlink communication is associated with a semi-persistent scheduling (SPS) allocation.

22. The network entity of claim 18, wherein the at least one DCI transmission indicates a first component carrier (CC) associated with the uplink communication and a second CC associated with the downlink communication.

23. A method of wireless communication performed by a user equipment (UE), comprising:
receiving, in a full duplex transmission mode, at least one downlink control information (DC1) transmission for scheduling an uplink communication and a downlink communication, wherein the at least one DCI transmission indicates a full duplex beam pair including a first beam associated with the uplink communication and a second beam associated with the downlink communication, the at least one DCI transmission comprising: a first DCI transmission that indicates the uplink communication and the downlink communication, and a second DCI transmission that indicates an additional uplink communication and an additional downlink communication; and
communicating with at least one wireless communication device based at least in part on the uplink communication and the downlink communication;
wherein the uplink communication is an uplink communication to a first transmit-receive point (TRP) of a plurality of TRPs, and wherein the downlink communication is a downlink communication from the first TRP; and
wherein the additional uplink communication is associated with a second TRP of the plurality of TRPs, and wherein the additional downlink communication is associated with the second TRP.

24. A method of wireless communication performed by a network entity, comprising:
transmitting, to a user equipment (UE) that is in a full duplex transmission mode, at least one downlink control information (DCI) transmission for scheduling an uplink communication and a downlink communication, wherein the at least one DCI transmission indicates a full duplex beam pair including a first beam associated with the uplink communication and a second beam associated with the downlink communication, the at least one DCI transmission comprising: a first DCI transmission that indicates the uplink communication, and a second DCI transmission that indicates an additional uplink communication and an additional downlink communication;and
communicating with the UE based at least in part on the uplink communication and the downlink communication;
wherein the uplink communication is an uplink communication to a first transmit-receive point (TRP) of a plurality of TRPs, and wherein the downlink communication is a downlink communication from a second TRP of the plurality of TRPs;
wherein the first DCI transmission indicates the uplink communication and an additional uplink communication associated with the first TRP; and wherein the additional downlink communication is associated with the second TRP.

* * * * *